(No Model.)
B. W. & J. L. LEESON.
GEAR WHEEL.
No. 301,246. Patented July 1, 1884.
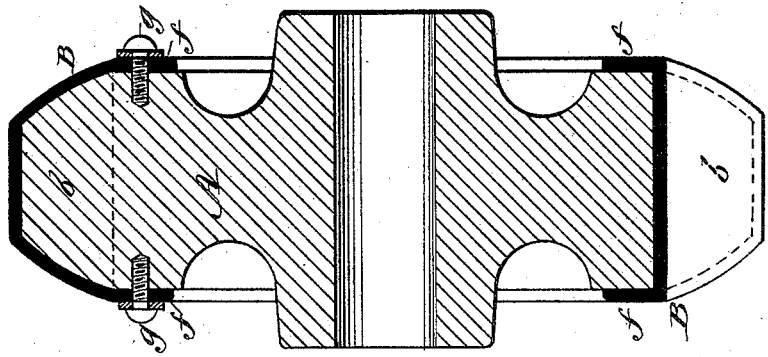
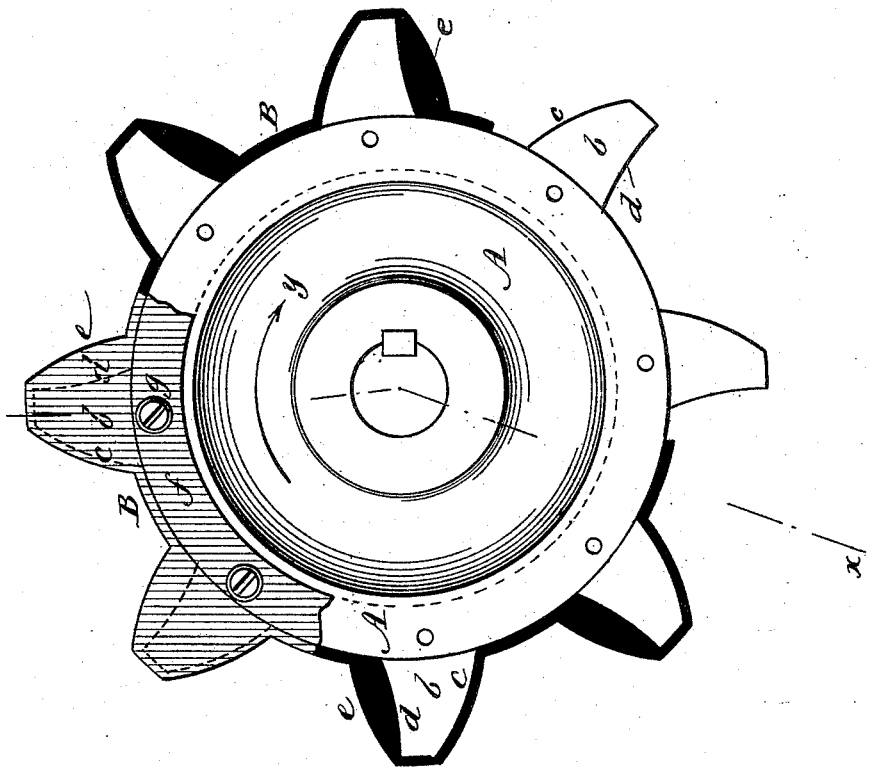
WITNESSES:
C. Neveux
C. Sedgwick
INVENTOR:
B. W. Leeson
J. L. Leeson
BY Munn & Co
ATTORNEYS.

United States Patent Office.

BENJAMIN W. LEESON AND JOSEPH L. LEESON, OF LITCHFIELD, ILLINOIS.

GEAR-WHEEL.

SPECIFICATION forming part of Letters Patent No. 301,246, dated July 1, 1884.

Application filed November 8, 1883. (No model.)

*To all whom it may concern:*

Be it known that we, BENJAMIN W. LEESON and JOSEPH L. LEESON, both of Litchfield, in the county of Montgomery and State of Illinois, have invented certain new and useful Improvements in Chain Gear and Other Toothed Wheels, of which the following is a full, clear, and exact description.

The invention consists of the detailed construction and combination of parts, substantially as hereinafter fully set forth and claimed.

Reference is to be had to the accompanying drawings, forming part of this specification, in which similar letters of reference indicate corresponding parts in both the figures.

Figure 1 is a side view of a rag-wheel with its cover partly in full, partly in section, and partly broken away. Fig. 2 is a transverse section of the same on the line $x\ x$ in Fig. 1.

A is the body of the wheel, which, together with the teeth $b$, may be made of metal, as usual; but said teeth, instead of being made of convex form both back and front, are only of convex shape on their backs $c$, and of concave form on their fronts or driving sides $d$, as shown in Fig. 1, in which the arrow $y$ indicates the direction of the wheel's travel. This construction of the driving sides of the teeth gives a better hold upon the chain; but its use is more marked in connection with the elastic covering applied to the teeth.

B is a rubber cap or covering constructed to fit tightly around the peripheral portion of the wheel and to hug and inclose or face each tooth $b$ separately. Said covering is made of an increased thickness, as at $e$, on the driving sides $d$ of the several teeth, to fit within the concave configurations of said sides, and to give more body to such portions of the covering where the wear and strain of or on the chain is felt, as well as to secure a proper face or driving-surface configuration to the teeth corresponding, it may be, with the convex form of the backs of the teeth.

The teeth $b$ themselves may be made tapering outward from opposite sides of the wheel, commencing at their roots, where they may be of the same breadth as the periphery of the body of the wheel. This construction will facilitate the putting on and taking off of the soft and elastic covering B. The covering B is molded to form flanges, $f$, which fit down or over each side of the body of the wheel far enough to provide for bolts or screws $g$ to pass through said flanges and through or into the body of the wheel, to hold the covering in place. These fastenings may be applied at or opposite each tooth, or at greater distance apart and in different relations with the teeth, as desired.

A rag or chain gear wheel thus provided with a soft and elastic covering applied to its teeth will run almost, if not quite, as noiselessly as a pulley driven by a belt, and with a surer motion at any speed. Said covering, too, by its elasticity, will protect the chain against wear and largely reduce its liability to breakage.

The invention also may be applied to other toothed wheels for transmitting motion.

Having thus described our invention, what we claim as new, and desire to secure by Letters Patent, is—

1. In a chain gear or other toothed wheel having a soft and elastic cap or covering applied to its toothed portion, the cap or covering constructed of increased thickness on the driving faces or sides of the teeth, essentially as described.

2. In a chain gear or other toothed wheel having a soft and elastic covering applied to its toothed portion, the teeth of the wheel made of concave form on their driving sides or faces, in combination with the elastic covering constructed of increased thickness on said sides or faces of the teeth, substantially as specified.

3. In a chain gear or other toothed wheel having a soft and elastic cap or covering applied to its toothed portion, the cap or covering constructed with opposite side flanges arranged to extend down or over the sides of the body of the wheel, essentially as described.

4. In a chain gear or other toothed wheel having a soft and elastic covering applied to its toothed portion, the teeth of the wheel constructed of tapering form outward from opposite sides of the wheel, substantially as specified.

BEN. W. LEESON.
JOSEPH L. LEESON.

Witnesses:
JOHN P. MCDONALD,
JAMES W. BUTTS.